United States Patent Office 3,119,698
Patented Jan. 28, 1964

3,119,698
ADDITIVES FOR FOAM-MAT DRYING
Robert C. Gunther, Galesburg, Ill., assignor to Gunther Products, Inc., Galesburg, Ill., a corporation of Illinois
No Drawing. Original application June 20, 1960, Ser. No. 37,068. Divided and this application May 21, 1963, Ser. No. 282,104
6 Claims. (Cl. 99—199)

This invention relates to a process for stabilizing foams, to stable foam compositions, and to products derived therefrom. The invention is especially concerned with the preparation of dried food powders which can be easily reconstituted by the addition of water thereto.

This application is a division of my copending application Serial No. 37,068, filed June 20, 1960.

Many different methods are known and various methods have been attempted over the years for the purpose of providing dried food products which can be reconstituted with water and which, when so reconstituted, will have a pleasing taste and flavor similar to the taste and flavor of the original product. It has long been recognized that it would be desirable to prepare such products but many of the methods that have been used leave much to be desired for one or more reasons. Among the methods that have been used are, for example, freeze drying and vacuum drying. One of the primary objections to these methods lies in the relatively expensive equipment required. Furthermore, they are limited in their application to relatively small number of food products.

Another method which has been developed is the method of Morgan et al. which is described in an article entitled "Technique for Improving Instants," Food Engineering, 31 (9), 86. This method is called "foam-mat" drying and the process consists essentially of three steps, namely: (1) formation of a stable foam containing the product to be dried, (2) air drying of the foam to form a thin porous sheet or mat, and (3) compression of the dried mat followed by disintegration to yield a free-flowing powder.

The first step is accomplished by whipping the desired product with a whipping agent and a suitable stabilizer in a conventional food beater. The foam density and initial bulk density of the product can be carefully controlled by proper balance of the stabilizer, whipping agent and whipping time. The second step is normally carried out by metering the stabilized foam onto a continuous belt which runs through drying ovens maintained at predetermined temperatures. Drying times have run as long as one hour and temperatures have ranged from 130° F. to 190° F. The third step involves removal of the dried foam mat intact from the continuous belt, compression to a high bulk density product and then disintegration to the desired powdered or other disintegrated form.

The foam-mat drying process is a very simple and inexpensive process. One difficulty that has heretofore been experienced with this process, however, is the lack of stability of the foam during the heating cycle. If the foam does not remain stable, cellular breakdown occurs causing serious impairment of the drying operation.

An object of the invention is the provision of an additive for addition to a liquid dispersion of a product to be dried by the foam-mat drying process which makes it possible to obtain new and improved results.

Other specific objects of the invention are the preparation of a new and improved dried orange juice which can readily be reconstituted in water to give an orange juice substantially identical to the original juice; the preparation of a new and improved dried tomato paste which when reconstituted in water gives a paste practically identical to the original paste; the preparation of a new and improved dried prune juice which when reconstituted in water gives a clear, excellent tasting juice; the preparation of a new and improved dried grape juice which when reconstituted in water gives juice indistinguishable from the original grape juice; the preparation of a new and improved dried whole milk which shows no tendency to break down and when reconstituted with water gives a milk which is substantially identical with the original milk; and the preparation of other food products and other types of dried products for food and industrial purposes. Other objects will appear hereinafter.

These objects are accomplished in accordance with the invention by employing in the foam-mat drying process a water soluble enzyme modified soy protein in intimate association with a water soluble cellulose alkyl ether or a water soluble cellulose hydroxyalkyl ether, or a water soluble cellulose in which the hydroxy groups of the cellulose are etherified with both alkyl and hydroxyalkyl groups. Examples of suitable alkyl groups which may be present in the preparation of the water soluble cellulose ethers are methyl, ethyl, hydroxyethyl, and/or hydroxypropyl groups. One specific example of a suitable water soluble cellulose ether is the water soluble cellulose methylether known as "Methocel" which is essentially the dimethylether of cellulose and has the following basic structure:

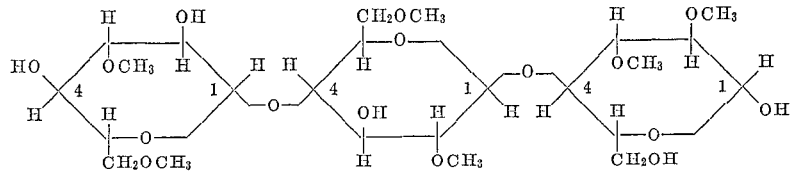

These products are made by etherifying purified cotton or wood cellulose by reacting an alkali cellulose with methyl chloride. Other specific cellulose ethers which are suitable for the practice of the invention are Methocel-60 HG, Methocel-65 HG, Methocel-70 HG, and Methocel-90 HG. The dimethylether of cellulose is sold under the trade name "Methocel MC" and the USP grade contains 27.5% to 31.5% methoxyl. The technical grade contains 26% to 33% methoxyl. The Methocel-60 HG contains 28% to 30% methoxyl and 7% to 12% hydroxypropoxyl. The Methocel-65 HG contains 27% to 29% methoxyl and 4.0% to 7.5% hydroxypropoxyl. The Methocel-70 HG contains 24% to 27% methoxyl and 3.0% to 5.5% hydroxypropoxyl. The Methocel-90 HG contains 19% to 24% methoxyl and 4% to 12% hydroxypropoxyl. These products are prepared in the form of powders and disperse in water to yield aqueous dispersions of various viscosities. They are also prepared in the form of aqueous dispersions in a broad range of viscosities from 10 to 8000 centipoises (2% aqueous dispersions at 20° C.).

The water soluble cellulose ethers which are effective for the purpose of the invention are all characterized by the fact that they form fluid solutions at room temperature, the viscosity of which decreases when the solutions are heated until the gelation temperature is reached, and decreases again when the heated solutions are cooled. The ability to gel on heating may be called thermal gelation and this in combination with the ability to become fluid again on cooling may be called reversible gelation. This unique property of reversible thermal gelation in combination with the properties of the enzyme modified soy protein allows the fluid mixes of products which it is desired to prepare in dry form to be whipped to the desired foam density with air or other gases and the foams produced to be stabilized on drying. The particular advantage of the reversible nature of the gelation property lies in the fact that these water soluble cellulose ethers can be used to stabilize foams prepared from juices, such as prune, grape, and the like, in which the reconstituted juice must have good clarity with no coagulated or gelled insolubles present.

The thermal gelation properties of the water soluble cellulose ethers employed in the practice of the invention is in marked contrast to the behavior of well known hydrophilic colloids, such as gelatin which tend to gel on cooling and become fluid with heat. For example, if gelatin is used as a stabilizer in a foam system it can very well form a stable foam at room temperature since gelatin will gel when cooled but when such a foam is heated to 150° F. to 160° F., as is done in the foam drying process, gelatin loses its stabilizing properties because it becomes fluid under the influence of heat and the foam stability is lost.

Especially good results have been obtained in the practice of the invention by employing either the dimethyl-ether derivatives of cellulose (Methocel MC) or an alkyl ether of cellulose which contains both methoxyl substitution and hydroxypropoxyl substitution in the cellulose chain (Methocel HG). As previously indicated, these cellulose derivatives are available in a wide variety of types and viscosities. All may be used in the practice of this invention under the right conditions and proper application because the predetermining factor in their use is the thermal gelation property. The particular concentration of the cellulose ether used in the practice of this invention will depend (1) upon the type and viscosity of the cellulose ether, and (2) upon the particular system being stabilized. For all practical purposes, however, it may be stated that the concentration of the water soluble cellulose ether may vary from 0.025% to 5.0% based on dry solids present in the system. For example, 200 parts by weight of prune juice with 25% solids would have 50 parts of dry solids, and 0.1% dimethyl ether of cellulose based on this would be 0.05 part of dimethyl ether of cellulose, which is adequate for the practice of the invention.

As previously indicated, an enzyme modified soy protein is another essential substance employed for the practice of the invention. Such soy proteins are made by steeping soy bean material in acidified water to remove the bulk of the solid nitrogen-free extract, subjecting the remaining material to hydrolysis with an enzyme, separating the solubles from the insolubles and concentrating the solubles. A suitable method for manufacturing an enzyme modified soy protein for the purpose of this invention is described in U.S. 2,489,173, column 4, lines 4–65. For the preferred practice of the invention a pepsin modified soy protein (prepared as described in U.S. Patent 2,489,173 at a pH of 5.0) is used. This substance is the essential ingredient of the substance hereinafter referred to as D–100 whipping agent (Gunther Products, Inc.). The quantity of the enzyme modified soy protein should be sufficient for whipping (i.e., to entrap air or other gas with the substance being treated). Generally, 0.1% to 5% by weight of the dry solids is sufficient and 0.4% to 1.5% by weight of the dry solids is preferred. The foamed products will usually have a density within the range of 0.15 to 0.60 gram per cubic centimeter (cc.).

The invention will be further illustrated but is not limited by the following examples in which the quantities are stated in parts by weight unless otherwise indicated.

EXAMPLE I

To 200 g. of concentrated, unsweetened orange juice (40% solids) was added 0.25 g. Methocel-65 HG (4000 centipoises) (10 g. of 2.5% solution) and 0.9 g. of D–100 vegetable protein whipping agent (3 g. of 30% solution). The mixture was stirred for a few minutes, then whipped on a Hobart Kitchen Aid mixer equipped with a wire whisk for 4 minutes. A firm, light foam was produced which weighed 0.23 g. per cc.

This foam was spread to approximately ¼ to ⅜ inch thickness on a Teflon coated fiberglass mat and dried in an oven at 155° F. Drying time required was approximately 1 hour. The mat produced showed no signs of breakdown during drying. It could be readily crushed and the powder readily reconstituted in water to give an orange juice identical to the original juice.

EXAMPLE II 0.75 g. of Methocel-65 HG (400 centipoises) (15 g. of 5% solution) and 0.6 g. of D–100 vegetable protein whipping agent (2 g. of 30% solution) were stirred into 300 g. applesauce at room temperature. The mix was beaten in a Kitchen Aid mixer for 4 minutes to give a light cream colored, very firm foam weighing 0.23 g. per cubic centimeter. The foam was dried on Teflon at 160° F. to 170° F. to produce a very light colored, easily reconstituted product.

EXAMPLE III

To 370 g. tomato paste (28% solids) was added 1.2 g. Methocel–65 HG (4000 centipoises) (30 g. of 4% solution) and 1.9 g. D–100 whipping agent (7.5 cc. of 25% solution). The mix was whipped in a Sunbeam Homestyle Mixmaster beater for 8 minutes to produce a light orange colored, firm foam weighing 0.40 g. per cubic centimeter. The foam was oven dried on a Teflon coated mat at 160° F. with no sign of breakdown. The dry mat could be easily crushed to produce a powder which when reconstituted in water gave a paste practically identical to the original paste.

EXAMPLE IV 200 g. prune juice (22% solids) was mixed with 0.375 g. Methocel-65 HG (4000 centipoises) (15 g. of 2.5% solution) and 0.3 g. D–100 whipping agent (1 g. of 30% solution). The mix was whipped with a wire whisk to produce a firm foam with a creamy consistency. The foam had a density of 0.21 g. per cubic centimeter. A small sample dried at 170° F. and a larger sample dried on Teflon at 160° F. produced excellent products with no sign of breakdown or discoloration. The resulting powder could be reconstituted very readily in water to give a clear, excellent tasting juice.

EXAMPLE V 0.6 g. of D–100 whipping agent (2 g. of 30% solution) and 0.25 g. of Methocel-65 HG (1500 centipoises) (10 g. of 2.5% solution) were added to 200 g. grape juice (concentrated and sweetened, 45% solids). The mix whipped 2 minutes in the Kitchen Aid mixer. The mix whipped extremely fast to produce a very light and very firm, almost rigid, foam having a density of 0.18 g. per cubic centimeter.

This foam was oven dried at 160° F. on the Teflon coated glass fiber mat in approximately 3 hours. The dried product showed no cellular breakdown or weep of any kind. The product was easily crushed to a fine deep purple colored powder which redissolved in water very readily to give a juice indistinguishable from the original grape juice.

EXAMPLE VI

To 200 g. of concentrated whole milk (approximately 25% solids) was added 0.6 g. Methocel-65 HG (4000 centipoises) (15 g. of 4% solution), and 0.6 g. D–100 whipping agent (3 g. of 20% solution). The mix was beaten in a Hobart Kitchen Aid beater for 5 minutes. A soft, fluffed product was obtained weighing 0.27 g. per cubic centimeter. A sample placed in the lab oven at 160° F. dried completely in 1 hour with no breakdown or weep.

The combined use of enzyme modified soy proteins and water soluble cellulose alkyl and hydroxyalkyl ethers, the aqueous dispersions of which have the property of increasing in viscosity when heated and which have the property of reversible thermal gelation in the foam-mat drying process is not limited to the specific examples which have been given for the purpose of illustration. The invention is generally applicable to the preparation of many different types of dried porducts, including dried fruits, dried vegetables, dried milk, and dried cereal products. Among the dried cereal products to which the invention may be applied are those products derived from wheat (e.g., cream of wheat), oats, (e.g., oatmeal), rice (e.g., rice puddings), corn (e.g., corn flakes), and barley (e.g., barley flakes).

The advantage of employing a water soluble enzyme modified soy protein in a foam-mat drying system is shown by the fact that orange juice in the presence of methyl cellulose shows absolutely no whipping properties until a small amount of the vegetable protein whipping agent is added, whereupon excellent foaming properties are achieved. Tomato paste in the presence of the dimethyl ether of cellulose but in the absence of any water soluble enzyme modified soy protein shows practically no whipping tendencies even after prolonged beating. The addition of a small amount of enzyme modified soy protein, however, allowed the same mix to beat up very readily to more than twice the original volume.

In Table A is presented the whip results and the storage results at both room temperature and 160° F. of a series of orange juice foams produced using various gums or thickeners as potential stabilizers. It is most graphically demonstrated that none of the gums or thickeners tested with the exception of the Methocels showed any stabilizing properties. The following whip composition was used:

|   | G. |
|---|---|
| Concentrated, unsweetened orange juice (40% solids) | 200 |
| D–100 whipping agent (3 g. of 25% solution) | 0.75 |
| Gum or thickener (10 g. of 2.5% solution) | 0.25 |

The ingredients were whipped at 25° C. in a Hobart Kitchen Aid beater (model K5A) for 4 minutes (using wire whisk). The density was immediately determined and small foam samples were stored at room temperature and 160° F. A definite break was measured as the time that elapsed prior to actual liquid drainage in the foam. It should be pointed out that regardless of whether a gum were present or not, the orange juice would not whip without the presence of the D-100 whipping agent.

Table A

| D–100 Whipping Agent plus— | Foam Density (g./cc.) | Foam Texture | Stability at room Temperature (minutes to break) | Stability at 160° F. (minutes to break) |
|---|---|---|---|---|
| None | 0.278 | weak | 10 | 4 |
| Guar Gum | 0.231 | do | 15 | 4 |
| Kelcosol [1] | 0.275 | do | 4 | 3 |
| Carboxymethyl cellulose | 0.253 | firm | 20 | 12 |
| Agar-Agar | 0.279 | weak | 3 | 3 |
| Locust Bean | 0.276 | do | 15 | 5 |
| Methocel-65 HG | 0.264 | very firm | 30 | no break |

[1] Propyleneglycol ester of alginic acid (Kelco Company).

It is to be particularly noted that in the case of the use of Methocel-65 HG that the foam sample held at 160° F. did not break whereas the same sample at room temperature showed weep in 30 minutes.

In Table B is presented the same series of gums and thickeners (as in Table A) with prune juice as the base instead of orange juice. Again it is to be noted that none of the representative gums or thickeners, other than Methocel MC, had any appreciable foam stabilizing properties, especially at 160° F. Here again the foam containing Methocel was more stable at 160° F. than at room temperature.

Table B

| D–100 Whipping Agent plus— | Foam Density (g./cc.) | Foam Texture | Stability at room Temperature (minutes to break) | Stability at 160° F. (minutes to break) |
|---|---|---|---|---|
| None | 0.114 | very firm | 12 | 3 |
| Guar Gum | 0.114 | do | 10 | 5 |
| Kelcosol | 0.111 | firm | 10 | 5 |
| Carboxymethyl cellulose | 0.107 | very firm | 35 | 5 |
| Agar-Agar | 0.151 | weak | 10 | 3 |
| Locust Bean | 0.086 | very firm | 15 | 8 |
| Methocel MC (4,000 cps.) | 0.093 | do | 75 | no break |

Tables A and B show that the water soluble cellulose ether in combination with the water soluble enzyme modified soy protein not only impart stability to the foamed composition at the elevated temperatures used in foam-mat drying but also provide more tolerance or intermediate time between the foaming operation which converts the product to a foamed state in which it contains numerous gas filled cells and the foam-mat drying operation in which it is dried without destroying the foamed state.

The water soluble cellulose ethers and the enzyme modified soy proteins employed for the purpose of the invention are edible, non-toxic substances and have the advantage that they have very little, if any, effect on the taste of the final product. This is due in part to the fact that they are employed in very small quantities. The invention is not limited to the preparation of food products but it can also be used in any foam-mat process for the preparation of other types of products, such as industrial products wherein it is desired to prepare a substance in dried powder form and this is accomplished by drying a foam of the substance at an elevated temperature. The temperature used may vary depending upon the substance. It should be below the scorching temperature of the substance and sufficiently high to cause water to be driven off at a relatively rapid rate. In general, temperatures above 120° F., and preferably within the range of 130° F. to 195° F., can be employed satisfactorily in the practice of this invention for drying the foam-mat but higher or lower temperatures can also be employed.

One of the special advantages of the invention is that it makes the foam-mat drying process applicable to a much wider variety of products. It also makes it possible to prepare some products in a dry form which have not heretofore been prepared in this form satisfactorily.

The invention also contemplates the provision of an additive which will function as a combined foaming and thermal foam stabilizing agent and which consists of an intimate mixture of an enzyme modified soy protein and a water soluble ether of cellulose from the group consisting of water soluble lower alkyl ethers of cellulose, water soluble lower hydroxy alkyl ethers of cellulose and water soluble ethers of cellulose containing both lower alkyl groups and lower hydroxy alkyl groups. Such additives may also contain other substance which are added for various purposes or which are inherently present due to the method of preparation of the enzyme modified soy protein. For example, in the preparation of enzyme modified soy proteins as outlined in U.S. Patent 2,489,173, an acid, such as hydrochloric acid, or phosphoric acid, can be used to maintain the desired pH when the soy protein is modified with an enzyme such as pepsin. The product is ultimately neutralized or partially neutralized and if hydrochloric acid is used in its manufacture some sodium chloride is formed in the product. If phosphoric acid is used in its manufacture some sodium phosphate is formed in the product. In some cases sodium chloride is added to the product for special reasons.

It is very often desirable in the practice of the invention to incorporate with the enzyme modified soy protein a sequestering edible water soluble polyphosphate, as, for example, sodium hexametaphosphate, sodium tetraphosphate or sodium tripolyphosphate. The addition of such substances enhances the foaming ability of the resultant composition.

In the D-100 whipping agent used in the examples the composition consists of:

60% by weight Enzyme modified soy protein
9.6% by weight sodium hexametaphosphate
5.4% by weight sodium chloride
3.7% by weight soy carbohydrates
16% sucrose, and the remainder water The sucrose is inert insofar as the foaming and stabilizing action of the composition are concerned. It is added primarily as a standardizing agent.

A composition of this type is intimately mixed with the water soluble cellulose ether in a weight ratio of from about 4:1 to 1:2. The resultant composition can also be intimately mixed with from zero to 25% by weight of a sequestering edible water soluble polyphosphate based upon the weight of enzyme modified soy protein in said composition. Inert ingredients, such as sucrose, soy carbohydrates, salt, and flavoring substances, can also be present in amounts up to 35% by weight of the enzyme modified soy protein in said composition. For any purpose where the dried material is to be reconstituted with water to form a clear product the additive should be free from gelatin and similar substances which tend to become fluid when hot and gel when cold.

The invention is hereby claimed as follows:

1. An additive for addition to a liquid dispersion of a product to be dried by the foam-mat process of drying which consists essentially of an intimate mixture of a water soluble enzyme modified soy protein and a water soluble reversible thermally gellable ether of cellulose from the group consisting of water soluble lower alkyl ethers of cellulose, water soluble lower hydroxy alkyl ethers of cellulose and water soluble ethers of cellulose containing both lower alkyl groups and lower hydroxy akyl groups, the relative proportions of said water soluble enzyme modified soy protein and said water soluble reversible thermally gellable ether of cellulose in said additive, when said additive is incorporated with a liquid dispersion of a product to be dried and thereafter beaten, being sufficient to produce a foamed product having a density within the range of 0.15 to 0.60 gram per cubic centimeter and characterized by foam stability when dried by the foam mat process of drying.

2. An additive for addition to a liquid dispersion of a product to be dried by the foam-mat process of drying which consists essentially of an intimate mixture of a water soluble enzyme modified soy protein and a water soluble reversible thermally gellable ether of cellulose from the group consisting of water soluble lower alkyl ethers of cellulose, water soluble lower hydroxy alkyl ethers of cellulose and water soluble ethers of cellulose containing both lower alkyl groups and lower hydroxy alkyl groups, the weight ratio of said enzyme modified soy protein to said water soluble ether of cellulose being within the range of 4:1 to 1:2.

3. An additive for addition to a liquid dispersion of a product to be dried by the foam-mat process of drying which consists essentially of an intimate mixture of a water soluble enzyme modified soy protein and a water soluble reversible thermally gellable ether of cellulose from the group consisting of water soluble lower alkyl ethers of cellulose, water soluble lower hydroxy alkyl ethers of cellulose and water soluble ethers of cellulose containing both lower alkyl groups and lower hydroxy alkyl groups, the weight ratio of said enzyme modified soy protein to said water soluble ether of cellulose being within the range of 4:1 to 1:2, said additive also containing sequestering edible water soluble polyphosphate in amounts up to 25% by weight of said enzyme modified soy protein.

4. An additive for addition to a liquid dispersion of a product to be dried by the foam-mat process of drying which consists essentially of an intimate mixture of a water soluble enzyme modified soy protein and a water soluble reversible thermally gellable ether of cellulose from the group consisting of water soluble lower alkyl ethers of cellulose, water soluble lower hydroxy alkyl ethers of cellulose and water soluble ethers of cellulose containing both lower alkyl groups and lower hydroxy alkyl groups, the weight ratio of said enzyme modified soy protein to said water soluble ether of cellulose being within the range of 4:1 to 1:2, said additive also containing up to 35% by weight of substances from the group consisting of sucrose, soy carbohydrates, salt and flavoring substances, based on the weight of said enzyme modified soy protein.

5. An additive as claimed in claim 2 in which said water soluble ether of cellulose is a reversible thermally gellable methyl ether of cellulose.

6. An additive as claimed in claim 2 in which said water soluble ether of cellulose is a reversible thermally gellable mixed ether of cellulose containing both methoxyl and hydroxypropoxyl groups.

References Cited in the file of this patent

UNITED STATES PATENTS

| 2,489,208 | Turner | Nov. 22, 1949 |
| 2,955,046 | Morgan | Oct. 4, 1960 |
| 2,955,943 | Morgan | Oct. 11, 1960 |